Feb. 26, 1963 P. J. H. JANSSEN ETAL 3,079,561

CIRCUIT ARRANGEMENT FOR STABILIZING A SAW-TOOTH CURRENT THROUGH A COIL AND A RESULTANT PULSATORY VOLTAGE

Filed May 26, 1959 2 Sheets-Sheet 1

INVENTOR
PETER JOHANNES HUBERTUS JANSSEN
WOUTER SMEULERS
BY
Frank R. Jifani
AGENT INVENTOR
PETER JOHANNES HUBERTUS JANSSEN
WOUTER SMEULERS
BY
Frank R. Jifari
AGENT United States Patent Office 3,079,561

Patented Feb. 26, 1963

3,079,561

CIRCUIT ARRANGEMENT FOR STABILIZING A SAW-TOOTH CURRENT THROUGH A COIL AND A RESULTANT PULSATORY VOLTAGE

Peter Johannes Hubertus Janssen and Wouter Smeulers, both of Eindhoven, Netherlands, assignors to North American Philips Company, Inc., New York, N.Y., a corporation of Delaware Filed May 26, 1959, Ser. No. 815,939
Claims priority, application Netherlands June 13, 1958
7 Claims. (Cl. 328—183)

Figure 1:
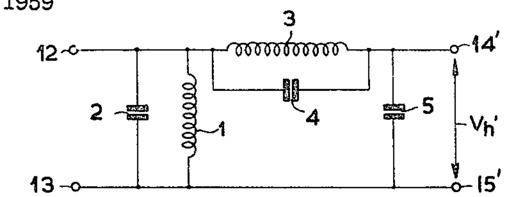

The present invention relates to circuit arrangements for stabilizing a saw-tooth current through a coil and a resultant pulsatory voltage by means of an amplifying element to which a signal is supplied which cuts off said element periodically and the output circuit of which comprises the primary winding of a transformer. This primary winding is coupled to the coil, while the pulses through the primary winding of the transformer during the fly-back time of the saw-tooth current, which pulses are made up of a fundamental and a higher harmonic, are fed to a rectifying circuit after having been stepped up by means of a secondary winding, the circuit arrangement comprising a regulating circuit which in the case of variations, in particular variation of the load connected to the rectifying circuit, stabilizes in the desired manner the amplitude of the saw-tooth current and the value of the direct voltage produced by the rectifying circuit.

Circuits of this type are inter alia employed in television receivers, in which said coil is the line-deflection coil and the produced very high direct voltage is used for feeding the output anode of the picture tube.

The regulating circuit serves to convert variations, in particular variation of the current through the picture tube, into a control voltage which is applied to the input terminal of the amplifier element, which is usually a pentode, so as to stabilize the amplitude of the saw-tooth deflection current and the produced direct voltage such that the dimensions of the reproduced picture do not practically vary.

As is known, regulating circuits suffer from a limitation in that, if something is to be regulated, information has to be procured anywhere from the circuit, which information is converted into a control voltage by the regulating circuit and subsequently applied to the circuit element to be regulated.

In so-called forward regulation, where the information for the regulating circuit is derived from the input signal, the output voltage or output current can be maintained perfectly constant, since in the case of variation of the input signal this input signal itself is not stabilized, so that said variation is conserved as information for the regulating circuit.

If, however, so-called backward regulation is used, the information for the regulating circuit will be derived from the output signal. Upon variation of the output voltage or output current, either due to variation of the input signal or variations in the circuit itself, or again due to variation of the load connected to the output terminals, exactly this output voltage or output current will be maintained as constant as possible. This means that, during regulation, the information supplied to the regulating circuit decreases until a state of equilibrium is reached, in which a small residual variation unavoidably subsists in the output voltage or output current.

The circuit arrangement for producing the saw-tooth current and the direct voltage, in which backward regulation circuit is concerned, poses a similar problem. As a matter of fact, if the information for the regulating circuit is derived directly from the output transformer and this output voltage, after peak rectification, is supplied to the regulating circuit, this regulating circuit itself should have a considerable amplification factor in order to maintain the amplitude of the saw-tooth current and the resultant direct voltage as constant as possible. This permits the residual variation of the output signal to be made relatively small and notwithstanding that a sufficient regulating voltage to be obtained.

Naturally, limits are set to raising the amplification of said regulating circuit, since the efficiency of the circuit arrangement as a whole decreases according as said amplification is increased.

In the circuit arrangement in accordance with the invention these disadvantages are avoided and for this purpose the circuit arrangement is characterized in that the regulating circuit is proportioned such that the regulating circuit is released and controlled by means of pulses derived from the transformer during that portion of the fly-back time of the saw-tooth current, which follows after the occurrence of that peak of the pulsatory voltage supplied to the rectifying circuit, which controls this rectifying circuit.

This solution is based on the recognition that it is upon variation of the current through the picture tube that usually the greatest variation of the voltage derived from the transformer occurs during the second half of the fly-back of the saw-tooth current. By utilizing this variation, it is consequently possible to make the amplification factor of the regulating circuit itself lower than in hitherto known circuits, whilst obtaining the same stabilization of said output voltage and output current.

Figure 2:
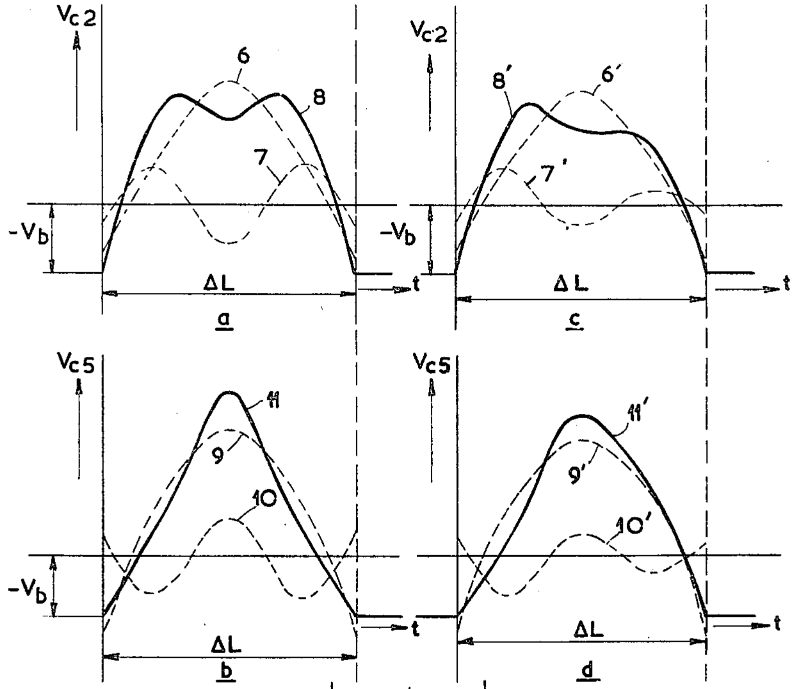
Figure 3:
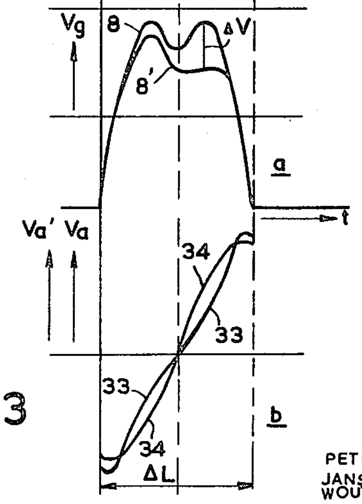
Figure 4:
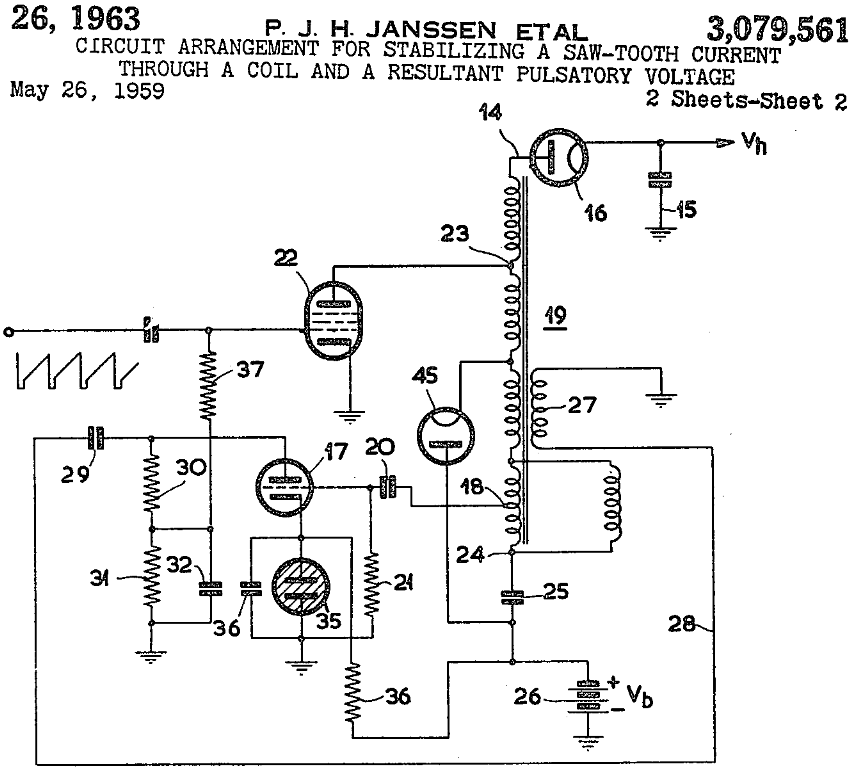
Figure 5:
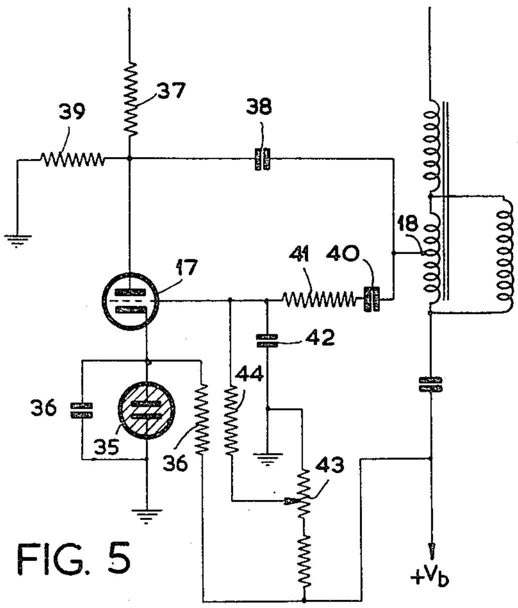
Figure 6:
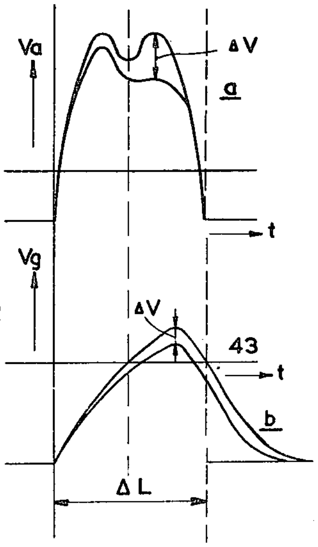

In order that the invention may be readily carried into effect, examples of circuit arrangements according to the invention will now be described in detail with reference to the accompanying drawings, in which FIG. 1 shows the substitution diagram of the line output transformer, FIGS. 2 and 3 are curves illustrating the voltage waveforms of the transformer of FIG. 1, FIG. 4 shows a first embodiment of a circuit arrangement according to the invention, FIG. 5 shows a second embodiment of the invention; and FIG. 6 shows curves illustrating the voltage waveforms of the circuit of FIG. 5.

In FIG. 1, the reference numeral 1 designates the winding of a transformer, which comprises both the primary flux and the secondary flux. A capacity 2 represents the overall parasitic capacity bridging the winding 1. A winding 3 represents the leakage inductance transformed to the primary side, a capacity 4 represents the parasitic capacity shunting this leakage inductance, and the capacitative load of the high-voltage circuit, which load is also transformed to the primary side, is designated by 5.

By means of this substitution diagram it can be calculated that during the fly-back time $\Delta L$ of the saw-tooth current the voltage across the capacity 2 will be as shown in FIG. 2*a*, while the voltage across the capacity 5 will be as shown in FIG. 2*b*, at least if the capacity 5 is not shunted by a load element. As may be seen from FIG. 2, both the voltage across the capacity 2 ($V_{c2}$) and the voltage across the capacity 5 ($V_{c5}$) are made up of a fundamental and a higher harmonic. In FIG. 2*a*, the fundamental harmonic is represented by a curve 6, the higher harmonic by a curve 7. Addition of both yields the voltage set up across the capacity 2 during the fly-back time $\Delta L$ of the saw-tooth current. This voltage is represented by the curve 8. Beyond the fly-back time $\Delta L$ the voltage across 2 equals $-V_b$ volt, that is the counter electromotive force prevailing across the inductance 1, which force is substantially equal and opposite to the voltage delivered by the source of supply voltage.

It is to be noted that with the optimum value of the transformer the frequency of the higher harmonic is approximately $$3\cdot\left(1-0.36\frac{z}{1-z}\right)$$

times as high as that of the fundamental harmonic. In this formula, $$z=\frac{\Delta L}{L}$$

where $\Delta L$ represents the fly-back time and L represents the overall line time. If $z=15\%$, the frequency of the higher harmonic is approximately 2.8 times as high as that of the fundamental harmonic.

The voltage across the capacity 5 is also made up of the fundamental harmonic, which is represented by curve 9, and a higher harmonic represented by curve 10. Addition of both yields the overall voltage across the capacity 5, which is represented by curve 11. Also from this figure it is seen that beyond the fly-back time $\Delta L$ the voltage across the capacity 5 substantially equals $-V_b$ volt. From FIG. 2*b* it is further seen that the oscillation represented by curve 9 is in phase with that represented by the curve 6 shown in FIG. 2*a*, whereas the oscillation represented by curve 10 is in phase-opposition to that represented by curve 7, which results in that the curve 11 shows only one maximum, whereas the curve 8 shows two maxima and one minimum.

Since the terminals 12 and 13 shown in FIG. 1 may be regarded as the input terminals of the line output transformer, and the terminals 14', 15' may be regarded as the virtual output terminals ($V'_h$ is the stepped-down high voltage $V_h$) the curves 8 and 11 will apply only if the load across the actual output terminals 14 and 15 (FIG. 4) is infinitely high, that is if the beam current of the picture tube is suppressed.

As may be seen from FIG. 4, the high voltage $V_h$ feeding the output anode of the picture tube is obtained by means of a rectifying circuit which reacts to the peaks of the output voltage produced across terminals 14 and 15, that is to say the diode 16 shown in FIG. 4 will respond to the peak of the voltage across the capacity 5 so that with an increase in load, due to modulation of the beam current by the video-signal or by brightness control, this peak will ever again be lower. The result may be seen from FIGS. 2*c* and 2*d*. As a matter of fact, at a given load, the voltage across the capacitor will correspond to the curve 11' shown in FIG. 2*d*. Analysis reveals that this curve is made up of a fundamental harmonic represented by curve 9' and a higher harmonic represented by curve 10'. It is found that notably the amplitude of the higher harmonic has decreased which is found from comparison of the curves 10' and 10. Investigation of the influence of this load variation on the voltage across the capacity 2 learns that, due to the considerable amplitude variation of the higher harmonic, the voltage across the capacity 2, which is made up of the higher harmonic represented by curve 7' and the fundamental harmonic represented by curve 6' has as a whole dropped relatively to the case in which the load is infinitely high, and that the second maximum has dropped far more than the first maximum.

This may also be explained in a different manner. Since, as stated before, peak rectification greatly affects in particular the amplitude of the higher harmonic, but this influence can occur only at the instant the voltage across the capacity 5 has a maximum (peak curves 11 and 11' respectively), the maximum of curves 10 and 10' respectively will experience the influence of load variation. The first minimum, that is the negative amplitude of the voltage represented by curves 10 and 10' respectively, will substantially not be influenced by said load variation. Since the higher harmonic is to be regarded as a damped oscillation, it will be evident that if the first positive-going amplitude is damped more strongly as a result of the increase in load, the second negative-going amplitude of this higher harmonic also decreases due to the increase in damping.

Reverting to the voltage across the capacity 2, it will be appreciated that the first positive-going amplitude of the higher harmonic represented by curve 7' will be little damped by said load variation, in contradistinction to subsequent negative and positive amplitudes. Due to the fact that the amplitude of the fundamental harmonic will slightly decrease due to said load variation, the first maximum of the voltage across the capacity 2 also decreases, but this drop is far smaller than that of the second maximum, which is strongly influenced by the second positive amplitude of the higher harmonic.

This is once more illustrated in FIG. 3*a* again showing curve 8, which represents the unloaded state, and curve 8' which represents a given loaded state. From this figure it is clearly seen that the voltage variation $\Delta V$ during the second half of the fly-back time $\Delta L$ exceeds that occurring during the first half of this fly-back time.

FIG. 4 shows a circuit arrangement in which the regulating circuit, comprising a triode 17 and associated circuit elements is proportioned such that this valve is controlled only during said second half of the fly-back time $\Delta L$.

This is secured as follows:

Voltage pulses are supplied through a capacitor 20 and a leakage resistor 21 to the control grid of tube 17 from a tapping 18 of the primary winding of the line output transformer 19. The anode of a pentode 22, acting as an amplifying element, is connected to one end 23, which corresponds to terminal 12 shown in FIG. 1, of the complete primary winding of the line output transformer 19, whose other end 24 is connected through a capacitor 25, the so-called booster diode capacitor, to the positive terminal of a source 26 of supply voltage, whose negative terminal is earthed. This source of supply voltage delivers a voltage of $V_b$ volt. The secondary winding of transformer 19 is connected between point 23 and the anode of diode 16. Across this winding the voltage represented in FIGS. 2*a* and 2*c* respectively are stepped up so that the voltages shown in FIGS. 2*b* and 2*d* respectively are set up at the anode of the diode 16. The anode of valve 17 is fed from an additional winding 27 of the transformer 19. This winding is provided so as to produce negative pulse voltages across it. These pulse voltages are supplied over a lead 28 to a network made up of capacitor 29, resistor 30, resistor 31 and capacitor 32. The capacitor 29 and the resistor 30 constitute a differentiating network, while the resistor 31 and the capacitor 32 constitute a smoothing network.

As a result of the differentiating action of the network 29, 30 the voltage on the anode of valve 17 will have the form shown in FIG. 3*b* (curve 33). Production of this voltage may be explained as follows. During the flyback time $\Delta L$, the current through the primary winding of transformer 19 may to a degree of approximation be represented by the formula $i=I.\cos\Omega t$, where $i$ represents the instantaneous value and I represents the amplitude of the saw-tooth current, while $\Omega$ represents the angular frequency of the fundamental harmonic shown in FIG. 2. The voltage across the primary winding with self-inductance $L_p$ is found from $$V_p=-L_p\frac{di}{dt}$$

so that the voltage across this primary winding may be written $V_p=+L_p\Omega I\sin\Omega t$. This voltage is inverted in phase by 180° as a result of transformation from the primary winding to the auxiliary winding 27 and is subsequently differentiated once more by the network 29, 30. This yields $V'_a=-L_p.\Omega^2.I\cos\Omega t$. Since the voltage across the primary winding and consequently also that across the primary winding 27 of transformer 19 is constant beyond the fly-back time $\Delta L$, the voltage $V'_a$ will have the form shown in FIG. 3*b* (curve 34). In this explanation, the influence of the higher harmonics has been neglected. If, however, they are considered, the result is a voltage $V_a$ represented by curve 33.

It is consequently found that the voltage on the anode of the tube 17 is positive with respect to earth only during the second half of the fly-back time $\Delta L$, hence anode current is allowed to flow only during this second half. This anode current is controlled by the voltage pulse shown in FIG. 3*a* which, as stated before, is applied to the control grid of valve 17, thus reaching the goal.

The regulating circuit further comprises a stabilizer tube 35 which is connected between the cathode of tube 17 and earth and is shunted by a smoothing capacitor 36. The junction point of the cathode and the tube 35 is likewise connected, through a resistor 47, to the positive terminal of the source of supply voltage 26. This yields a constant bias for the valve 17, which bias is likewise made as high as possible so that the voltage pulses from the tapping 18 may be unduly strong. The bias and the tapping 18 might be lower, but this would mean that both the amplitude of the voltage pulse and the resultant voltage variation $\Delta V$ would decrease, so that the advantage of the considerable voltage variation upon load variations would be lost. Fundamentally, the amplitude of the voltage pulse applied to the control grid of tube 17 should consequently be as high as possible. However, a limit is set by the properties of tube 17 and these properties can be improved only by making provision of said bias by means of the stabilizer tube 35. Of course, the amplitude of the voltage pulse represented by curve 33 should be sufficient to render the anode of tube 17 at any desired instant sufficiently positive relative to the cathode.

The regulating voltage, which is applied to the tube 22, is obtained by smoothing, by means of a capacitor 32, the pulsatory current of the tube 17, which flows through the resistors 30 and 31, and by applying the smoothed negative voltage thus obtained to the control grid of tube 22 through a leakage resistor 37.

It is to be noted that the obtained regulating voltage may be such that, upon variation of the load, the first maximum of the voltage shown in FIG. 2*c* (curve 8') is substantially maintained constant. This means that the amplitude of the saw-tooth current is substantially stabilized and consequently the produced direct voltage $V_h$ will vary only slightly. As a matter of fact, this high voltage, also if the deflection current were maintained perfectly constant, would still be subject to a small variation upon variation of the load and this as a result of the impedance present in the circuit and constituted by the leakage inductance 3 and the parasitic capacity 4. Consequently, a choice has to be made between maintaining the amplitude of the deflection current substantially constant, with a resultant small variation of the direct voltage $V_h$, and overcompensation of the deflection current so that the produced direct voltage $V_h$ remains substantially constant. In both cases, however, the size of the reproduced television picture will be subject to a small variation since this size is determined by the formula $I=\text{constant}.\sqrt{V_h}$. This formula allows of calculating that the dimensions of the picture will not substantially vary if:

$$\frac{\Delta I}{I}=\frac{1}{2}\cdot\frac{\Delta V_h}{V_h}$$

where $$\frac{\Delta I}{I}$$

represents the relative variation of the amplitude of the saw-tooth current $$\frac{\Delta V_h}{V_h}$$

represents the relative variation of the produced direct voltage. It is thus possible to adjust the regulating circuit such that said small relative variation in amplitude of the saw-tooth current is minimized and, by a judicious choice of the internal resistance of the regulated tube 22 relatively to the impedances constituted by the elements of the line output transformer 19, to obtain the desired corresponding relative variation of the produced direct voltage.

A second feasibility of utilizing, for controlling the tube 17, the considerable variation $\Delta V$ during the second half of the fly-back period of the saw-tooth current is illustrated in FIG. 5. In this figure, wherein corresponding parts have substantially the same reference numerals, the pulsatory voltage from the tapping 18 is supplied on the one hand, through capacitor 38 and resistor 39, to the anode of the tube 17 and on the other hand, by way of a high-value separating capacitor 40, through an integrating network made up of resistor 41 and capacitor 42, to the control grid of tube 17. The voltage obtained by means of the integrating network is shown in FIG. 6*b*, while the voltage applied to the anode is shown in FIG. 6*a*. By means of the stabilizer tube 35 the bias of tube 17 is so adjusted as to permit this tube to carry current only during the second half of the fly-back period $\Delta L$. This is represented in FIG. 6*b*, wherein the line 43 represents the cut-off voltage of the tube 17 in this setting. From FIGS. 6*b* and 6*a* it consequently appears that upon variation of the load a considerable voltage variation occurs during the second half of said fly-back period both on the control grid of the tube 17 and on the anode of this tube which voltage variation is again utilized for producing a negative voltage which is supplied to the tube 22 through the resistor 37. In this instance, the capacitor 38 and the resistor 39 moreover act as a smoothing filter.

If necessary, the setting of the tube 17 may be varied by means of the variable tapping on the resistor 46, which tapping is likewise connected, through a resistor 44, to the control grid of the tube 17.

It will be appreciated that transistors or other amplifying elements may be employed for use in said circuit arrangements if only provision be made that the elements then used are released only during the second half of said fly-back period $\Delta L$. This is ensured when using as a control voltage the integrated voltage shown in FIG. 6*b* and biasing said elements such that only the great voltage variation is again utilized. It is also possible to substitute a non-linear element, for example a diode, for the amplifier element and, by rectification of the integrated voltage, to obtain a regulating voltage fulfilling the aforesaid requirements for regulating the circuit. It will be evident that in such cases the amplitude of the voltage pulse applied to the anode of the diode shall be larger, hence the tapping 18 will then have to comprise more turns of the primary winding than in the circuits of FIGS. 4 and 5. This is possible by connecting, for example, the tap 18 to the same tap to which the cathode of the booster diode 45 shown in FIG. 4 is connected. To the cathode of the diode a positive direct voltage having a sufficient value has to be applied so that only the part of the voltage above the line 43 shown in FIG. 6*b* determines when the diode will carry current.

It is also possible to derive the control voltage from the secondary winding instead of deriving it from the primary winding. Also in this case, as is found when comparing FIGS. 2*b* and 2*d*, the voltage variation during the second half of the fly-back period will exceed that occurring during the first half.

The line output transformer may alternatively be so proportioned that the frequency of said higher harmonic is approximately $$5\left(1-0.39\frac{z}{1-z}\right)$$

times as high as that of the fundamental harmonic. If $z=15\%$ this frequency substantially corresponds to 4.66 times that of the fundamental harmonic.

In this case, the voltage across the capacity 5 will have two peaks. The rectifier 16 will be controlled by the first peak so that again the voltage variation on the primary side is mainly determined by the value of the first negative-going amplitude of the higher harmonic, which amplitude is heavily damped by the energy delivered to the rectifying circuit. However, this amplitude now occurs earlier than in the preceding case. Hence, control of the regulating circuit can occur earlier, that is to say, right after the occurrence of the first peak of the pulse voltage on the secondary, since the second peak, due to the damping of the first, will be too small for partaking in the control of the rectifying circuit.

Operation of the regulating circuit may also in this case occur in a manner as illustrated in FIG. 5. The bias delivered by the stabilizer tube 35 should then be matched such that the tube 17 is released earlier than when the frequency of the higher harmonic was approximately 2.8 times as high as that of the fundamental harmonic.

What is claimed is:

1. In a circuit for producing a high voltage and a current having a sawtooth shaped waveform through a coil, of the type comprising a transformer having a primary and secondary winding, an amplifying device having an input and an output circuit, means connecting said output circuit to said primary winding, means applying a signal to said input circuit which periodically cuts off said device whereby flyback pulses having a fundamental frequency and a harmonic frequency are produced across said primary winding, rectifier circuit means connected to said secondary winding and means coupling said coil to said primary winding, means for stablizing said current and high voltage comprising a unidirectional current device having at least two electrodes, a source of voltage, means connecting one of said electrodes to said source of voltage, means galvanically connecting the other of said electrodes to said input circuit to provide a bias for said amplifying device, and means coupled to said transformer for rendering said unidirectional current device a conductive only during that portion of said flyback pulses subsequent to occurrence of that peak of pulsating current from said secondary winding which controls said rectifier circuit.

2. In a circuit for producing a high voltage and a current having a sawtooth shaped waveform through a coil, of the type comprising a transformer having a primary and secondary winding, an amplifying device having an input and an output circuit, means connecting said output circuit to said primary winding, means applying a signal to said input circuit which periodically cuts off said device whereby flyback pulses having a fundamental frequency and a harmonic frequency are produced across said primary winding, a rectifier circuit means connected to said secondary winding and means coupling said coil to said primary winding, means for stabilizing said current and high voltage comprising a unidirectional current device having at least two electrodes, a source of voltage, means connecting one of said electrodes to said source of voltage, means connecting the other of said electrode to said input circuit to provide a bias for said amplifying device, means coupled to said transformer for providing a pulsatory control voltage having a first peak subsequent the occurrence of the peak of pulsatory current which controls said rectifier circuit, and means applying said control voltage to an electrode of said unidirectional current device whereby said unidirectional current device is rendered conductive only subsequent that peak of said pulsatory current from said secondary winding which controls said rectifier circuit.

3. In a circuit for producing a high voltage and a current having a sawtooth shaped waveform through a coil, of the type comprising a transformer having a primary and secondary winding, an amplifying device having an input and an output circuit, means connecting said output circuit to said primary winding, means applying a signal to said input circuit which periodically cuts off said device whereby flyback pulses having a fundamental frequency and a harmonic frequency are produced across said primary winding, rectifier circuit means connected to said secondary winding and means coupling said coil to said primary winding, means for stabilizing said current and high voltage comprising an amplifying element having an output electrode and a control electrode, means coupling said control electrode directly to said transformer, means coupled to said transformer providing a pulsatory voltage having a peak subsequent to occurrence of that peak of pulsatory current from said secondary winding which controls said rectifier circuit, means connecting said pulsatory voltage to said output electrode whereby said element is rendered conductive only during said peak of said pulsatory voltage, and means connecting said output electrode to said input circuit of said amplifying device to provide a bias for said device.

4. A circuit of claim 3 comprising a tertiary winding on said transformer, means applying the output of said tertiary winding to a differentiating network, means applying the output of said differentiating network to said output electrode, and smoothing filter means connecting said output electrode to said input circuit.

5. The circuit of claim 4 in which said amplifying element is a triode, comprising a source of constant voltage, and means connecting the cathode of said triode to the positive terminal of said source of constant voltage.

6. In a circuit for producing a high voltage and a current having a sawtooth shaped waveform through a coil, of the type comprising a transformer having a primary and secondary winding, an amplifying device having an input and an output circuit, means connecting said output circuit to said primary winding, means applying a signal to said input circuit which periodically cuts off said device whereby flyback pulses having a fundamental frequency and a harmonic frequency are produced across said primary winding, rectifier circuit means connected to said secondary winding and means coupling said coil to said primary winding, means for stabilizing said current and high voltage comprising an amplifying element having an output electrode and a control electrode, capacitor means coupling said output electrode to said primary winding, integrating circuit means coupling said control electrode to said primary winding, means biasing said amplifying element whereby said element is rendered conductive only subsequent the occurrence of that peak of pulsatory current of said secondary winding which controls said rectifier circuit, and filter means connecting said output electrode to said input circuit to provide a bias for said amplifying device.

7. The circuit of claim 6 in which said amplifying element is a triode, comprising a source of constant voltage, and means connecting the cathode of said triode to the positive terminal of said source of constant voltage.

References Cited in the file of this patent

UNITED STATES PATENTS

| | | |
|---|---|---|
| 2,712,616 | Leeds | July 5, 1955 |
| 2,751,520 | Nelson | June 19, 1956 |
| 2,801,365 | Squires | July 30, 1957 |
| 2,851,632 | Janssen et al. | Sept. 9, 1958 |
| 2,874,329 | Janssen et al. | Feb. 17, 1959 |
| 2,879,441 | Luther et al. | Mar. 24, 1959 |
| 2,944,186 | Boekhorst et al. | July 5, 1960 |